United States Patent
Terry et al.

(10) Patent No.: US 9,878,578 B2
(45) Date of Patent: Jan. 30, 2018

(54) WINDSCREEN FOR HOUSING A SANDING SYSTEM, RAILWAY VEHICLE WITH SANDING SYSTEM, AND METHOD FOR INSTALLING A SANDING SYSTEM IN A RAILWAY VEHICLE

(71) Applicant: SIEMENS INDUSTRY, INC., Alpharetta, GA (US)

(72) Inventors: Mark S. Terry, El Dorado Hills, CA (US); John Maranski, Folsom, CA (US); Jeremy D. Olson, Cameron Park, CA (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 233 days.

(21) Appl. No.: 14/870,820

(22) Filed: Sep. 30, 2015

(65) Prior Publication Data

US 2017/0087935 A1   Mar. 30, 2017

(51) Int. Cl.
 B60B 39/04   (2006.01)
 B61C 15/10   (2006.01)
 B61D 1/00   (2006.01)
 B61H 11/00   (2006.01)
 B61D 17/18   (2006.01)

(52) U.S. Cl.
 CPC ............ B60B 39/04 (2013.01); B61C 15/10 (2013.01); B61C 15/107 (2013.01); B61D 1/00 (2013.01); B61D 17/18 (2013.01); B61H 11/005 (2013.01)

(58) Field of Classification Search
 CPC ....... B60B 39/00; B60B 39/02; B60B 39/021; B60B 39/022; B60B 39/04; B60B 39/06; B61C 15/08; B61C 15/10; B61C 15/107
 See application file for complete search history.

(56) References Cited

U.S. PATENT DOCUMENTS 3,345,098 A * 10/1967 Kilgore ............... B61C 15/102
                                                 105/59
2004/0160064 A1   8/2004 Kish et al.
2011/0198864 A1   8/2011 Pietrowski
2011/0297754 A1 * 12/2011 Valdez ................ B05B 7/0416
                                                 239/8

FOREIGN PATENT DOCUMENTS

| CN | 103434514 A | 12/2013 |
| CN | 204415384 U | 6/2015 |
| CN | 104787059 A | 7/2015 |
| WO | 2010084085 A1 | 7/2010 |

OTHER PUBLICATIONS

PCT International Search Report and Written Opinion of International Searching Authority dated Dec. 5, 2016 corresponding to PCT International Application No. PCT/US2016/051466 filed Sep. 13, 2016.

* cited by examiner

Primary Examiner — Robert J McCarry, Jr.

(57) ABSTRACT

A windscreen for housing a sanding system, a railway vehicle with a sanding system, and a method for installing a sanding system in a railway vehicle are described. The windscreen includes a first shell element and a second shell element, the first shell element being detachably connected to the second shell element, wherein the first and second shell elements, when assembled, form an interior space. A container is in communication with a sanding system for housing material used when the sanding system is in operation, wherein the container is configured to be positioned in the interior space formed by the first and second shell elements of the windscreen.

20 Claims, 4 Drawing Sheets

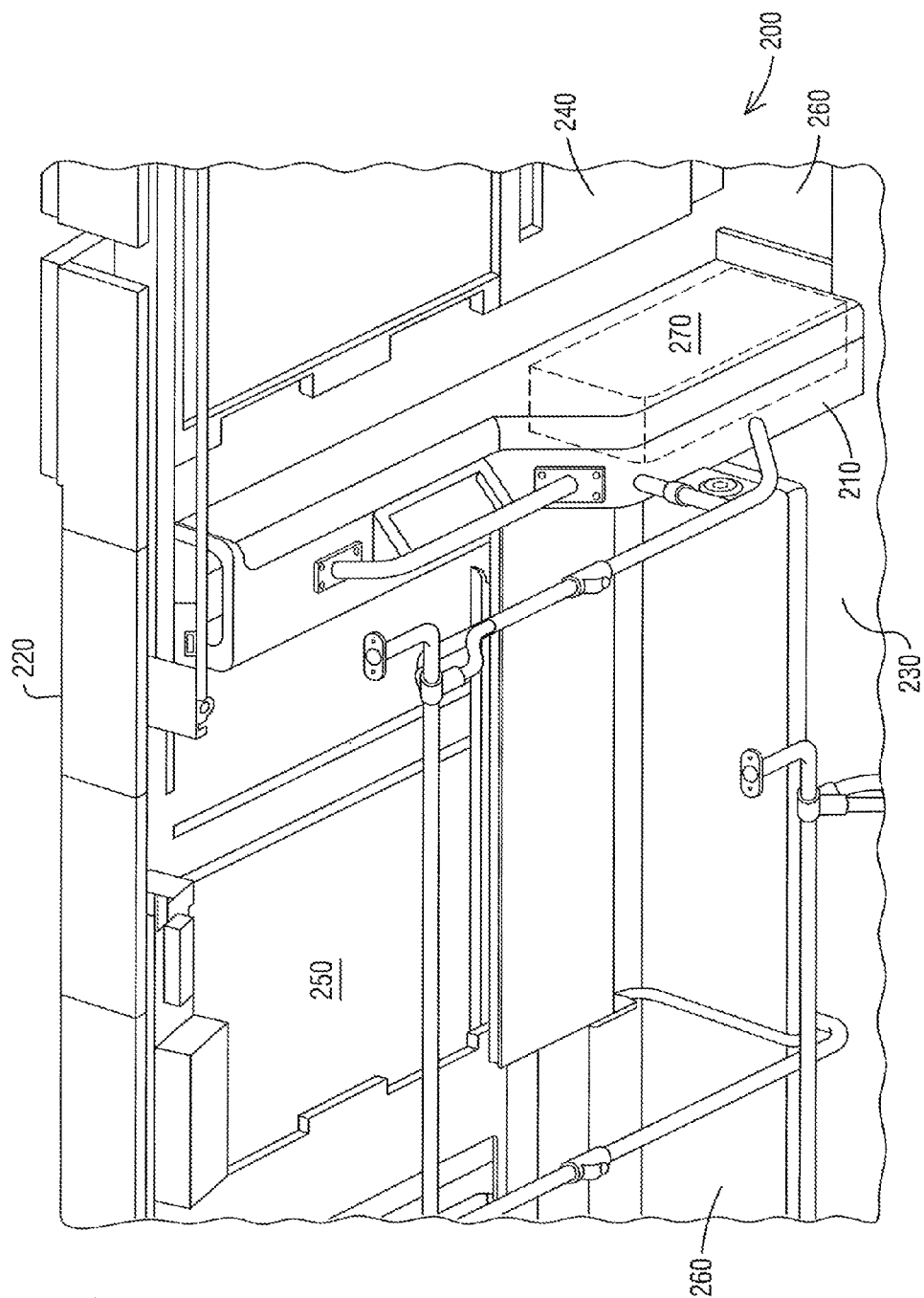

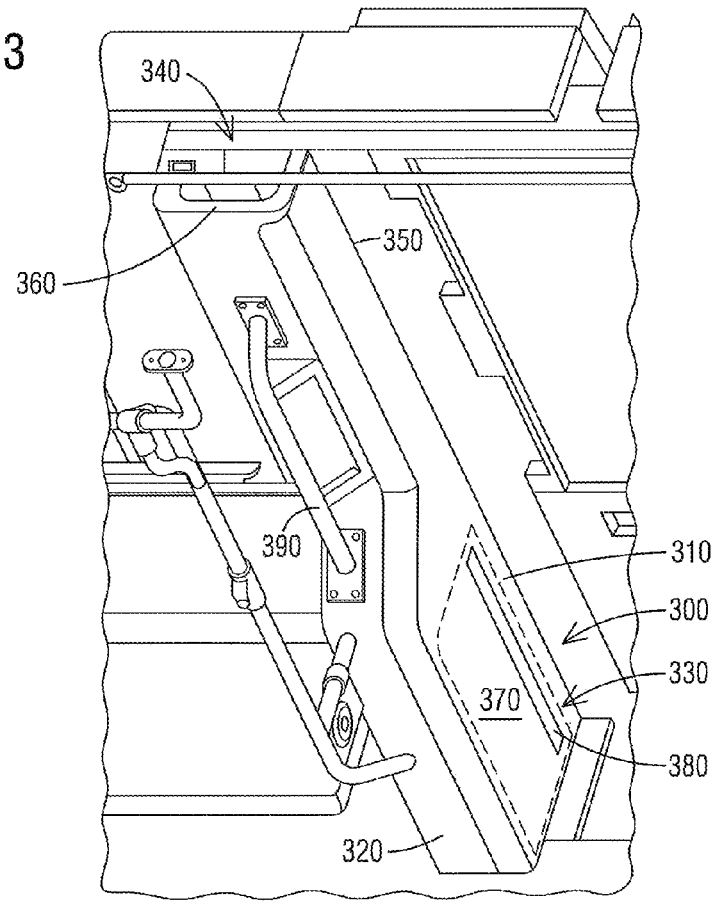

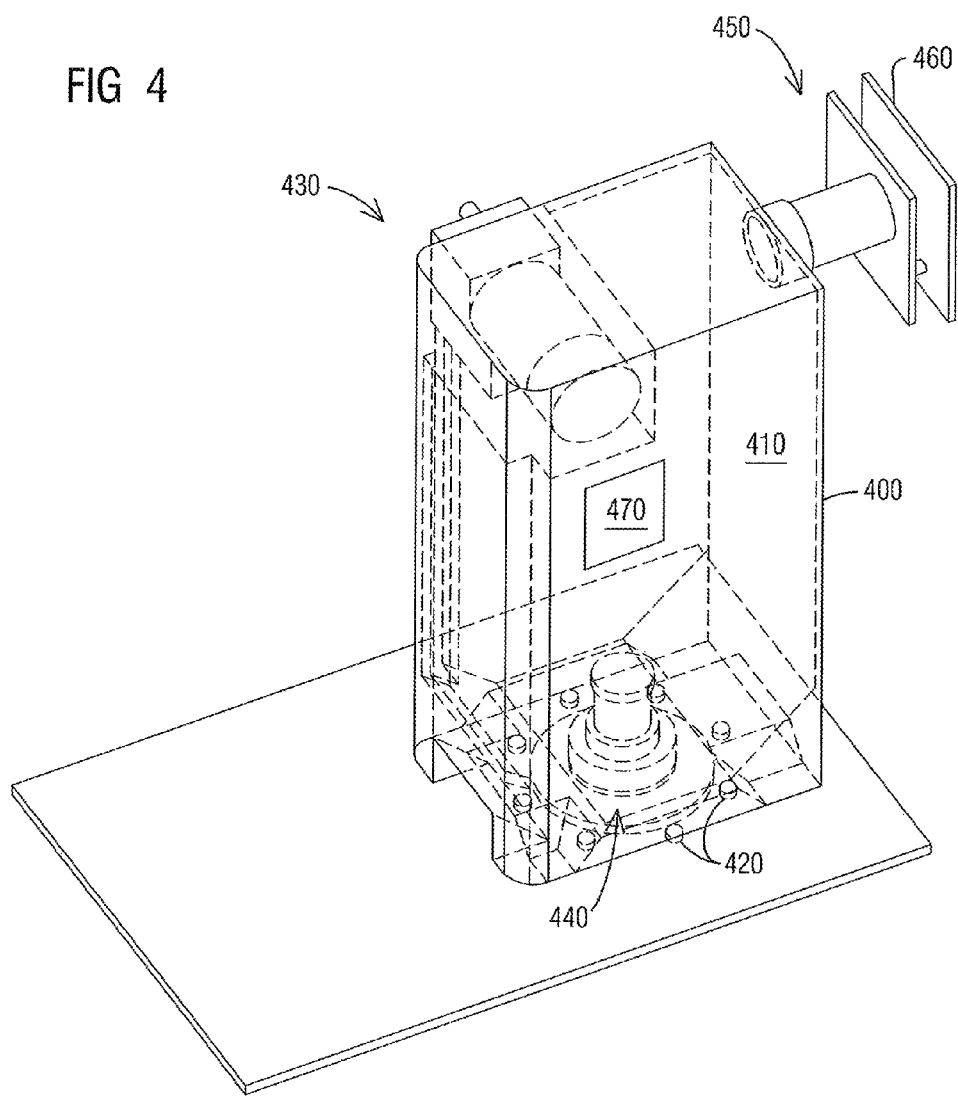

WINDSCREEN FOR HOUSING A SANDING SYSTEM, RAILWAY VEHICLE WITH SANDING SYSTEM, AND METHOD FOR INSTALLING A SANDING SYSTEM IN A RAILWAY VEHICLE

BACKGROUND

1. Field

Aspects of the present invention relate to integrating a windscreen with a door post cover and sanding system such that the windscreen will be used for housing a sanding system, a railway vehicle with a sanding system, and a method for installing a sanding system in a railway vehicle.

2. Description of the Related Art

Modern locomotives are commonly powered by electric traction motors coupled via suitable gearing to one or more axles of the vehicle. In operation mode, the fraction motors are supplied with electric current from a controllable source of electric power, such as an engine-driven alternator, to rotate the one or more axles of the vehicle. The one or more axles drive one or more wheels which, in turn, support the locomotive on the rail and propel the vehicle along a railroad track. In braking mode, the electric fraction motors may have their mode changed to function as generators to assist the mechanical brakes of the vehicle in slowing speed of the railway vehicle. In any mode of operation, good adhesion between the wheels and the rails is required for efficient operation of the vehicle. The peak pulling and braking capability of the railway vehicle may be limited by the adhesion available between the drive wheels and the rails. Contaminants such as snow, water, grease, insects and rust that are present on the rails can reduce the maximum available adhesion.

In order to improve the adhesion between the drive wheels and the rails, particularly in the presence of snow, ice or grease, railway vehicles are often equipped with a sanding system, also known and referred to as sander system. A sanding system may include a container comprising a supply of sand, also known as sandbox, or other particulate matter selectively delivered to a nozzle having an outlet directly in front of one or more drive wheels of the vehicle. The nozzle directs a quantity of for example sand between the rails and the wheels.

Such containers or sandboxes of a sanding system are typically placed under passenger seats inside the railway car. For example, a sandbox may be placed under a flip seat and thus may encroach into a designated area for wheelchairs, also referred to as ADA ("Americans with Disabilities Act") seating area. Furthermore, sandboxes under passenger seats create obstacles that maintenance staff must clean around. In order to mitigate these issues, sandboxes may be placed in a wall of the vehicle, under the vehicle below the vehicle floor, between seats, or the issue is simply managed. Windscreens are installed in passenger rail cars adjacent to doorways. The functions of a windscreen are to block the inrush of air when doors are cycled opened, act as a modesty panel for seated passengers, and, if installed on a high floor vehicle with steps, act as a safety device by blocking the side access to the stairway. Thus, an integrated and improved sanding system for a railway vehicle is desired.

SUMMARY

Briefly described, aspects of the present invention relate to a windscreen for housing a sanding system, to a railway vehicle with a sanding system, and to a method for installing a sanding system in a railway vehicle. Such railway vehicles can be any type railway vehicle, for example locomotives and attached railroad cars, railcars, streetcars, light rail vehicles, automatic (airport) shuttles, metros, commuter trains, EMUs (Electric Multiple Units), DMUs (Diesel Multiple Unit), and high speed trains. It is noted that not all types of existing railway vehicles are listed, because one of ordinary skill in the art is familiar with different types of railway vehicles, in particular railway vehicles that typically comprise a sanding system.

A first aspect of the invention provides a windscreen comprising a first shell element and a second shell element, the first shell element being detachably connected to the second shell element, wherein the first and second shell elements, when assembled, form an interior space, and comprise windscreen functionality; and a container in communication with a sanding system for housing material used when the sanding system is in operation, wherein the container is configured to be positioned in the interior space formed by the first and second shell elements.

A second aspect of the invention provides a railway vehicle comprising at least one windscreen located in an interior room of the railway vehicle, the at least one windscreen comprising a first shell element and a second shell element, the first shell element being detachably connected to the second shell element, wherein the first and second shell elements, when assembled, form an interior space, and comprise windscreen functionality; and a container in communication with a sanding system, the container being configured to house material used when the sanding system is in operation, wherein the container is positioned in the interior space formed by the first and second shell elements.

A third aspect of the present invention provides a method for installing a sanding system in a railway vehicle comprising providing a windscreen comprising a first shell element and a second shell element, wherein the first and second shell elements, when assembled, form an interior space, and comprise windscreen functionality; mounting a container of a sanding system to an interior room of the railway vehicle; and assembling and installing the windscreen such that the container is positioned in the interior space formed by the first and second shell elements of the windscreen.

BRIEF DESCRIPTION OF THE DRAWINGS

FIG. 2 is a perspective view of an exemplary windscreen arranged in a railway vehicle, comprising a sanding system in accordance with an exemplary embodiment.

FIG. 3 is an enlarged perspective view of the exemplary windscreen of FIG. 2 in accordance with an exemplary embodiment.

FIG. 4 is a perspective view of an exemplary container of a sanding system in accordance with an exemplary embodiment.

FIG. 5 is a flow chart of a method for installing a sanding system in a railway vehicle in accordance with an exemplary embodiment.

DETAILED DESCRIPTION

Figure 1:
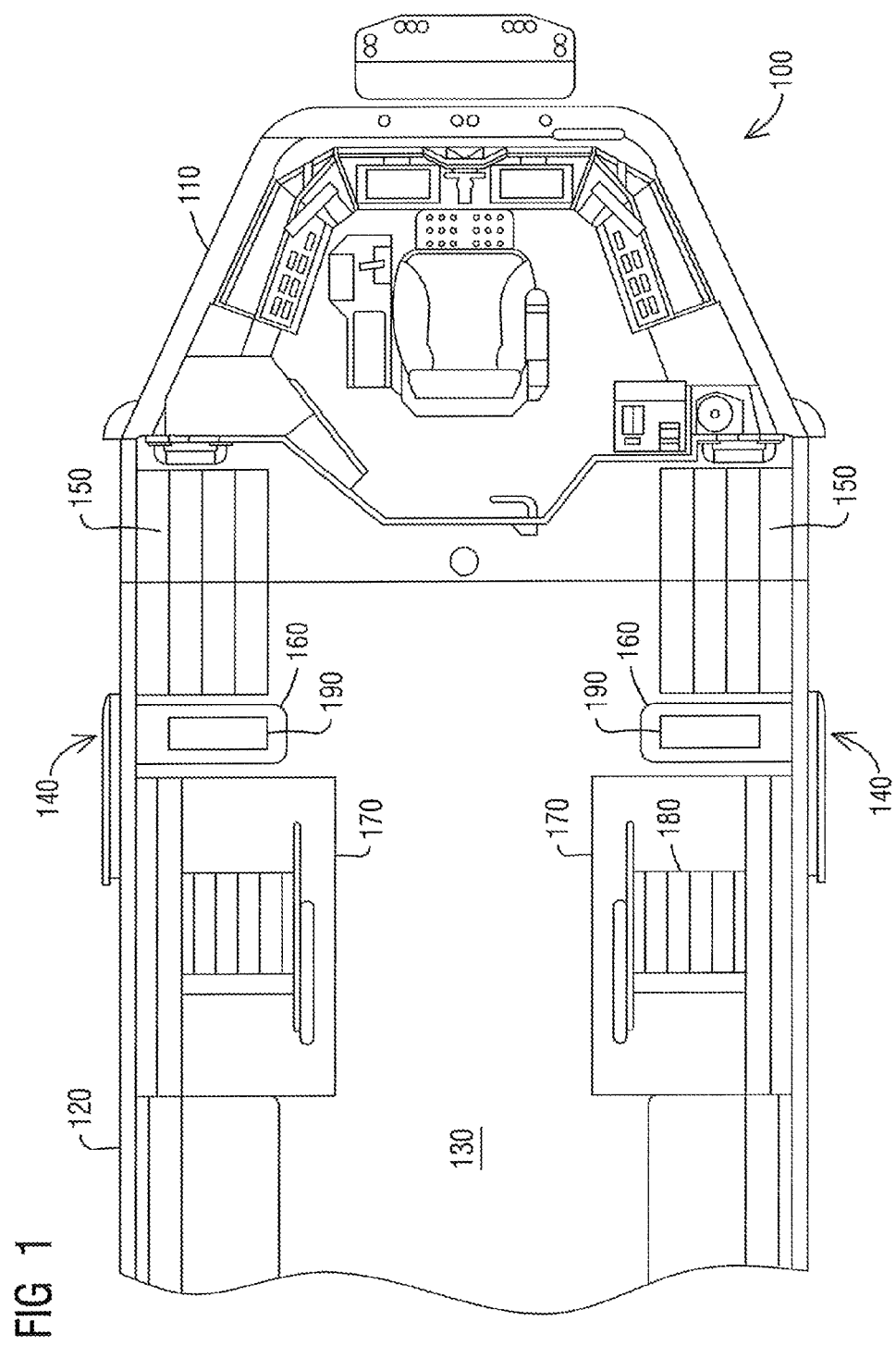
FIG. 1 is a schematic representation of a cross-section through a vehicle body, for example a railcar body, in accordance with an exemplary embodiment.

To facilitate an understanding of embodiments, principles, and features of the present invention, they are explained hereinafter with reference to implementation in illustrative embodiments. In particular, they are described in the context of being a railway vehicle with a sanding system, a windscreen housing such a sanding system, and methods for installing a sanding system in a railway vehicle. Embodiments of the present invention, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

FIG. 1 is a schematic representation of a cross-section through a part of a railroad car 100, in particular a top view in section of the railroad car 100, in accordance with an exemplary embodiment. The partly shown railroad car 100 comprises a plurality of elements, such as for example a cab 110, also referred to as crew compartment or driver's compartment. The railroad car 100 further comprises a body shell 120 having an interior room 130. The body shell 120 comprises one or more doors systems 140 which can comprise for example automatic doors which open and close so that passengers can enter and exit the car 100 via doorways 150. The one or more doorways 150 can include stairwells, as illustrated in FIG. 1, but the doorways 150 may be configured without stairwells. The interior room 130 can further comprise one or more designated areas for wheelchairs 180, also referred to as ADA ("Americans with Disabilities Act") seating area or wheelchair area 170. In particular, 49 C.F.R. 38 "Americans with Disabilities Act Accessibility Specifications for Transportation Vehicles" requires two wheelchair areas 170 per car section.

Windscreens 160 are located near the doorways 150 for passenger comfort and safety. Typically, a windscreen is a sheet of material attached with stanchions or other means to the interior floor of the vehicle interior 130. The windscreens 160 can be arranged on one side of the doorway 150, for example left or right adjacent to the doorway 150, as illustrated in FIG. 1. Alternatively, the windscreens 160 can be arranged on either side of the doorway 150. The windscreens 160 help to block wind and weather from open doors of the door systems 140, act as a modesty panel for seated passengers, and prevent passengers from accidentally stepping into the stairwells or through open doorways 150.

According to an exemplary embodiment, at least one of the windscreens 160 comprises a shell, in particular a windscreen shell, which performs all the same functionality as a regular windscreen, but additionally provides an envelope to place railway equipment such as a sanding system, in particular a container 190, for example a sandbox, of a sanding system as schematically shown in FIG. 1. The windscreen shell of the windscreen 160 comprises for example fiber-reinforced plastic (FRP) material. In particular, the windscreen shell can be manufactured from FRP material. Many other suitable materials that would perform the same or a similar function can be used, for example other plastic or synthetic materials.

As the windscreens 160 are near the doorways 150, which are typically placed near axles of the railway vehicle 100, the windscreens 160 are an ideal location for placing the container 190 of a sanding system.

FIG. 1 shows that the ADA seating areas 170 can be located adjacent to the windscreens 160 opposite the doorways 150, i.e. the windscreens 160 are located between the doorways 150 and the areas 170. As the ADA seating areas 170 are next to the windscreens 160, and the windscreens 160 comprise at least the container 190 of the sanding system, the container does not need to be placed anywhere else in the interior room 130 of the vehicle 100, in particular not under flip seats where they may encroach into the seating areas 170. Thus, the wheelchairs 180 can be easily maneuvered into the ADA seating areas 170.

FIG. 2 is a perspective view of an exemplary windscreen 210 arranged in a railway vehicle, comprising a sanding system in accordance with an exemplary embodiment. FIG. 2 illustrates a section of the railroad car 200 in a perspective view. Similar as to what is shown in FIG. 1, the railroad car 200 comprises a plurality of elements, for example body shell 220 having an interior room 230. The body shell 220 comprises one or more doors systems 240 which can comprise for example automatic doors which open and close so that passengers can enter and exit the car 200, and a plurality of windows 250. The railroad car 200 comprises a plurality of seats 260, which can be regular sets or flip seats or a combination of both. It should be noted that the railroad car 200 and its components will not be described in further detail as one of ordinary skill in the art is familiar with railroad cars.

Windscreens 210 are located near doorways 260 for passenger comfort and safety. As noted before, the windscreens 210 can be arranged on one or both sides of the doorway 260. At least one of the windscreens 210 of the railway car 200 comprises a windscreen shell performing functionalities of a regular windscreen, but additionally providing space for housing a sanding system, in particular a container 270 of a sanding system. The container 270 is only schematically shown using dotted lines in FIG. 2.

FIG. 3 is an enlarged perspective view of the exemplary windscreen of FIG. 2 in accordance with an exemplary embodiment. Windscreen 300 comprises a first shell element 310 and a second shell element 320, the complementary shell elements 310, 320 forming a windscreen shell. The first and second shell elements 310, 320 comprise for example fiber-reinforced plastic (FRP) material. In particular, the shell elements 310, 320 can be manufactured from FRP material. The shell elements 310, 320, also referred to as shell components, are detachably connected to each other. For example, first shell component 310 can be removed from the shell component 320. A detachable connection between the shell elements 310, 320 can be configured for example as bolted connection, screw coupling, etc. In an embodiment, one of the shell elements, for example shell element 310, can comprise smaller dimensions than the other shell element, for example shell element 320, so that element 310 can be partly inserted into element 320 and detachably coupled to component 320.

In a further exemplary embodiment, the windscreen 300 can comprise more than first and second shell elements 310, 320. The windscreen 300 can comprise a plurality of individual shell elements as it may be favourable for example for manufacturing processes or assembling the windscreen 300. For example, windscreen 300 can comprise three or four individual shell elements which, when assembled, form the windscreen 300. At least one of the shell elements of the plurality of shell elements is detachably coupled to at least one further shell element so that an inside space of the windscreen 300 is accessible.

The first and second shell elements 310, 320 are configured such that, when assembled, form an interior space 330 for housing a container 370, for example a container for a sanding system. The container 370 is only schematically shown in FIG. 3 using dotted lines. As described before, a sanding system installed in a railway vehicle is used for improving adhesion between the drive wheels and the rails, particularly in the presence of snow, ice or grease. The container 370 comprises a supply of sand, or other particulate matter, which is selectively delivered to a nozzle having an outlet directly in front of one or more drive wheels of the vehicle 100 (see FIG. 1). The container 370 is also known as sandbox and will be described in more detail in FIG. 4.

Because the windscreen 300 houses the containers 370, the interior space 330 of the windscreen 300 needs to be accessible so that the container 370 can be placed into the windscreen 300. Furthermore, the container 370 needs to be regularly serviced as the sanding system is an important safety feature of the railway vehicle. Thus, the windscreen 300 comprises the at least two windscreen shell elements 310, 320 detachably coupled so that the container 370 can be accessed by for example service personnel or other inspectors.

In a further exemplary embodiment, the windscreen 300 functions as a cover for doorpost 340. Therefore, the windscreen 300 forms at one side, in particular side 350 directed towards a sidewall of the body shell 220 (see FIG. 2) a U-shape 360, wherein the "U" of the U-shape 360 covers the doorpost 340. Furthermore, the assembled windscreen 300 does not comprise a bottom plate, i.e., a closed bottom side. Both first and second shell elements 310, 320 can be fastened to a floor of the interior room 230 of the railroad car 200 (see FIG. 2), for example directly fastened to the floor by bolts or screws. Also, the container 370 is directly fastened to the floor of the interior room 230 (see also description referring to FIG. 4). Thus, the windscreen shell element 320 can be easily removed without interfering with the container 370.

In a further exemplar embodiment, at least one of the windscreen shell elements 310, 320 comprises a sand level sight glass 380, only schematically shown in FIG. 3. The sight glass 380 is visible from the vehicle interior room 230 (see FIG. 2). In order to examine the level of sand (or other material) in the container 370, the container 370 may comprise a corresponding sight glass (see FIG. 4) or may be manufactured, at least partly, using transparent material as for example acrylic glass. Furthermore, at least one of the first and second shell elements 310, 320 can comprise a passenger handle 390.

The described windscreen 300 and the arrangement of the windscreen 300 allows taller, narrower containers 370 (sandboxes), that have a smaller footprint to be designed and are tucked away for easy cleaning, and do not interfere with ADA seating areas 170 which are typically located near doorways (see FIG. 1).

FIG. 4 is a perspective view of an exemplary container 400 of a sanding system in accordance with an exemplary embodiment. A railway vehicle typically comprises a plurality of sanding systems with a plurality of containers 400 (sandboxes).

As noted before, one or more container(s) 400 for a sanding system for a railway vehicle include(s) at least one exterior sight gage 410 for determining sand level. The sanding system is either usable with sand or $Al_2O_3$. Thus, the container 400 is either filled with sand or $Al_2O_3$. Alternatively, at least one wall of the container 400 may be manufactured by a transparent material as for example acrylic glass.

In a further exemplary embodiment, it is possible to design a sanding system, in particular a container 400, without a sight gage or glass 410, using a sensor to detect sand level in the container 400. Such a sensor can be an optical sensor located and arranged so that the sensor can detect the sand level of the container 400. For example, the sensor can be positioned within the container 400. Alternatively, the container(s) may simply not have a sight gage 410, and instead appropriate maintenance intervals can be used to ensure that container(s) 400 are full.

The container 400 is constructed for example of stainless steel or aluminum in order to minimize weight and prevent corrosion. Volume capacity, in particular sand volume capacity, of the container 400 can be for example 20 liters. It should be noted that a volume capacity of 20 liters is just an example and the container 400 can comprise many other volume capacities. For example, when using $Al_2O_3$ instead of sand, much less volume than 20 liters is sufficient. Any desired volume capacity can be used for the container 400. Depending on the volume of the container 400, the container 400 may need to be filled more frequently.

As described before, the container 400 can be mounted to the floor of the interior room 130 of the vehicle 100 (see FIG. 1), using for example a plurality of bolts 420. In an exemplary embodiment, the container 400 can be mounted to the floor by four bolts via tapping plates. Alternatively, the container 400 can be mounted to the floor and the wall of the interior room 130, for example via two bolts to the floor and two bolts to the wall, with or without tapping plates. In another embodiment, the container 400 can be mounted using one or more brackets, wherein the bracket(s) is/are attached to the floor of the interior room 130 of the vehicle 100 (see FIG. 1).

In a further exemplary embodiment, the container 400 comprises a closable flap 470, only shown schematically, accessible from the interior room of the railway vehicle when the first shell element 310 is detached from the second shell element 320.

A sanding system for a railway vehicle typically comprises a container 400, a compressor 430, a scatter unit 440, and a nozzle. The nozzle can be heated or non-heated. Further components of a sanding system are for example compressor intake filter, vehicle interface wiring with connector, nozzle heater interface wiring with conduit and connector, and flow control; these components are not described and/or illustrated in further detail herein. When the sanding system is in operation, the sand or $Al_2O_3$ provided in the container 400 is transported from the container 400, located in the interior room of the railroad vehicle, to a nozzle of a sanding nozzle assembly by means of a flexible rubber hose, run for example vertically, suitable for railroad and sand environment. The nozzle has an outlet (output nozzle) directly in front of one or more drive wheels of the vehicle. The nozzle directs a quantity of sand or $Al_2O_3$ between the rails and the wheels. The output nozzle is designed to apply sand as close to wheel-rail-interfaces as possible, while rejecting debris, grease and water. Furthermore, the sanding system can include an after blow unit or other means to propel sand (or $Al_2O_3$) through the hose that is run horizontally. A command to activate sanding typically comes from vehicle control wiring. The sanding nozzle assembly is not described in detail herein, but can comprise for example a heater, nozzle heater wiring with conduit and connector, hose with clamps, and mounting hardware kits. The output nozzle can include an electric heater capable of permitting maximum sand flow rate in the environment.

An output of the scatter unit 440 exits the bottom of the container 400 where it will penetrate the vehicle floor. Once sanding is activated, sand (or $Al_2O_3$) will exit the container 400 to the nozzle. Sand flow rate can be initially adjusted to for example 400 grams per minute at nominal voltage supply. The scatter unit 440 ejects sand as shallow as horizontally. The scatter unit 440 can include an electric heater capable of maintaining dry sand in the environment.

Furthermore, an exterior filling assembly 450 is in communication with the sanding system, in particular with the container 400. The exterior filling assembly 450 is used to fill the container 400 with sand or $Al_2O_3$ and comprises for example a hose with clamps, mounting hardware kits, housing, and an exterior door 460. The exterior filling assembly is not described in further detail herein. The exterior door 460 is located in a wall of the body shell and accessible from the outside of the railroad car so that sand or $Al_2O_3$ can be easily refilled from outside the vehicle. The exterior filler door 460 can be normally locked and is accessible with a key, if desired by the end user.

FIG. 5 is a flow chart of a method 500 for installing a sanding system in a railway vehicle 100, 200 in accordance with a windscreen 160, 210, 300 and a railway vehicle 100, 200 as described herein. In step 510, a windscreen 160, 210, 300 comprising a first shell element 310 and a second shell element 320 is provided, wherein the first and second shell elements 310, 320, when assembled, form an interior space 330, and comprise windscreen functionality. A container 190, 370, 400 of a sanding system is mounted to a floor of the railway vehicle 100, 200 (step 520). The windscreen 160, 210, 300 is assembled and installed in such a way that the container 190, 370, 400 is positioned in the interior space 330 formed by the first and second shell elements 310, 320 of the windscreen 210, 300 (step 530). It should be appreciated that some steps are not required to be performed in any particular order or are optional. For example, one of the windscreen shell elements 310, 320 may be installed in the railway vehicle 100, 200 before the container 190, 370, 400 is installed.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

What is claimed is:

1. A windscreen comprising:
   a first shell element and a second shell element, the first shell element being detachably connected to the second shell element, wherein the first and second shell elements, when assembled, form an envelope comprising a common interior space within the first and second shell elements; and
   a container in communication with a sanding system and comprising material used when the sanding system is in operation, wherein the container is positioned in the interior space of the envelope formed by the first and second shell elements.

2. The windscreen of claim 1, wherein the first and second shell elements comprise fiber-reinforced plastic (FRP) material.

3. The windscreen of claim 1, wherein at least one of the first and second shell elements comprises a level sight glass for determining a level of the material housed in the container.

4. The windscreen of claim 1, wherein the first and second shell elements forming the windscreen are for mounting within an interior room of a railroad car.

5. The windscreen of claim 4, wherein the windscreen is for mounting next to a doorway of the railroad car.

6. The windscreen of claim 4, wherein the first and second shell elements comprise a U-shape, wherein an open end of the U-shape is directed toward a sidewall of the interior room of the railroad car for covering a doorpost.

7. The windscreen of claim 1, wherein at least one of the first and second shell elements comprises a passenger handle.

8. A railway vehicle comprising:
   at least one windscreen located in an interior room of the railway vehicle, the at least one windscreen comprising:
      a first shell element and a second shell element, the first shell element being detachably connected to the second shell element, wherein the first and second shell elements, when assembled, form an envelope comprising a common interior space within the first and second shell elements; and
      a container in communication with a sanding system, the container comprising material used when the sanding system is in operation, wherein the container is positioned in the interior space of the envelope formed by the first and second shell elements, and wherein the container is mounted directly to an interior room of the railway vehicle.

9. The railway vehicle of claim 8 comprising a plurality of windscreens housing a plurality of containers in communication with a plurality of sanding systems.

10. The railway vehicle of claim 8, wherein the windscreen is located in proximity to a doorway of the vehicle.

11. The railway vehicle of claim 10, wherein the windscreen is located between the doorway and an area for placing wheelchairs.

12. The railway vehicle of claim 8, wherein the container comprises stainless steel or aluminum.

13. The railway vehicle of claim 8, wherein the container comprises a level sight glass or gage, and wherein at least one of the first and second shell elements comprises a corresponding level sight glass for determining a level of the material housed in the container.

14. The railway vehicle of claim 8, wherein the container comprises a closable flap accessible from the interior room of the railway vehicle when the first shell element is detached from the second shell element.

15. The railway vehicle of claim 8, wherein the container is accessible from outside the railway vehicle via an exterior filling assembly.

16. Method for installing a sanding system in a railway vehicle comprising:
   providing a windscreen comprising a first shell element and a second shell element, wherein the first and second shell elements, when assembled, form an envelope comprising a common interior space within the first and second shell elements;
   mounting a container of a sanding system directly to an interior room of the railway vehicle; and
   assembling and installing the windscreen such that the container is positioned within the interior space of the envelope formed by the first and second shell elements of the windscreen.

17. The method of claim 16, wherein the container comprises a scatter unit, and an output of the scatter unit exits a bottom of the container and penetrates a floor of the railway vehicle.

18. The method of claim 16, wherein the first shell element is detachably coupled to the second shell element.

19. The method of claim 16, wherein the container is accessible from outside the railway vehicle via an exterior filling assembly.

20. The method of claim 16, wherein the windscreen is located in proximity to a doorway of the railway vehicle.

* * * * *